US008855551B2

(12) United States Patent
Wan

(10) Patent No.: US 8,855,551 B2
(45) Date of Patent: Oct. 7, 2014

(54) SYSTEM AND METHOD FOR ONE CELL TO COVER MULTIPLE AREAS

(71) Applicant: Huawei Technologies Co., Ltd., Guangdong (CN)

(72) Inventor: Lilong Wan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/021,919

(22) Filed: Sep. 9, 2013

(65) Prior Publication Data

US 2014/0018091 A1 Jan. 16, 2014

Related U.S. Application Data

(63) Continuation of application No. 12/687,439, filed on Jan. 14, 2010, now Pat. No. 8,559,868, which is a continuation of application No. PCT/CN2008/071879, filed on Aug. 5, 2008.

(30) Foreign Application Priority Data

Aug. 14, 2007 (CN) .......................... 2007 1 0143608

(51) Int. Cl.
H04B 7/15 (2006.01)
H04W 88/08 (2009.01)
H04B 7/26 (2006.01)
H04W 72/04 (2009.01)
H04W 16/26 (2009.01)

(52) U.S. Cl.
CPC .......... H04W 72/0473 (2013.01); H04W 88/08 (2013.01); H04W 16/26 (2013.01); H04B 7/2606 (2013.01)
USPC ........... 455/11.1; 455/561; 370/329; 370/341

(58) Field of Classification Search
USPC ......... 455/522, 13.4, 127.1, 127.2, 69, 115.1, 455/439, 126, 103; 370/342, 318, 320, 441, 370/464, 465, 479, 322, 328; 375/296, 146, 375/141, 147, 220, 260
See application file for complete search history.

(56) References Cited

U.S. PATENT DOCUMENTS 5,280,472 A 1/1994 Gilhousen et al.
6,510,187 B2 * 1/2003 Saito et al. .................... 375/344
(Continued)

FOREIGN PATENT DOCUMENTS

CN 1547412 A 11/2004
CN 1774094 A 5/2006
(Continued)

OTHER PUBLICATIONS

Extended European Search Report in corresponding European Patent Application No. 13153722.7 (Apr. 4, 2013).
(Continued)

Primary Examiner — Sujatha Sharma
(74) Attorney, Agent, or Firm — Leydig, Voit & Mayer, Ltd.

(57) ABSTRACT

A system, method and network device for covering a plurality of areas by one cell are disclosed. The system includes: a plurality of radio frequency groups and at least one base band unit. One radio frequency group corresponds to one area of the cell, one radio frequency group corresponds to one date channel, and one base band unit is connected to a plurality of radio frequency groups through a plurality of date channels. The embodiment of the invention reduces the signal interference among each area of the same cell, increases the system capacity, and benefits cell splitting, i.e., benefits increasing the capacity and upgrading during network enhancement.

20 Claims, 6 Drawing Sheets

(56) References Cited

U.S. PATENT DOCUMENTS

| | | | |
|---|---|---|---|
| 6,999,428 B2* | 2/2006 | Miura | 370/318 |
| 7,508,796 B2* | 3/2009 | Tanabe | 370/335 |
| 2005/0059348 A1* | 3/2005 | Chae et al. | 455/63.4 |
| 2005/0181812 A1 | 8/2005 | Scheck | |
| 2008/0026759 A1* | 1/2008 | Sawamoto | 455/436 |
| 2010/0195627 A1* | 8/2010 | Sundarraman et al. | 370/336 |
| 2010/0265920 A1* | 10/2010 | Blanz et al. | 370/335 |

FOREIGN PATENT DOCUMENTS

| | | |
|---|---|---|
| CN | 101111049 A | 1/2008 |
| WO | WO 9627269 A1 | 9/1996 |
| WO | WO 2006040653 A1 | 4/2006 |

OTHER PUBLICATIONS

International Search Report in corresponding PCT/CN2008/071879 (Nov. 13, 2008).

$1^{st}$ Office Action in corresponding European Application No. 08783872.8 (Nov. 8, 2011).

Written Opinion of the International Searching Authority in corresponding PCT Patent Application No. PCT/CN2008/071879 (Nov. 13, 2008).

International Search Report in corresponding PCT Patent Application No. PCT/FI96/00112 (Sep. 9, 1996).

$1^{st}$ Office Action in corresponding Chinese Application No. 200710143608.X (Oct. 9, 2009).

* cited by examiner

BBU+RRU

SYSTEM AND METHOD FOR ONE CELL TO COVER MULTIPLE AREAS

CROSS-REFERENCE TO RELATED APPLICATIONS

This application is a continuation of U.S. patent application Ser. No. 12/687,439, filed Jan. 14, 2010, which is a continuation of International Patent Application No. PCT/CN2008/071879, filed Aug. 5, 2008. The International Patent Application claims priority to Chinese Patent Application No. 200710143608.X, filed Aug. 14, 2007. The afore-mentioned patent applications are hereby incorporated by reference in their entireties.

FIELD OF THE INVENTION

The present invention relates to network communication, and in particular, to a system, a method, a Base Station, and a Radio Network Controller (RNC) for one cell to cover multiple areas.

BACKGROUND

In the current communication system, one cell may cover multiple areas. Given below are two solutions to one cell covering multiple areas.

Solution 1: A Base Station and a repeater enable one cell to cover multiple areas, as shown in FIG. 1 and FIG. 2.

In FIG. 1, three areas, namely, area C, building A, and building B belong to the same cell. A local end 1 and a remote end 1 constitute a repeater, and a local end 2 and a remote end 2 constitute another repeater. Therefore, one Base Station and two repeaters accomplish coverage for three areas (A, B, and C) in a cell. Areas A, B, and C belong to one cell, and the cell corresponds to one Radio Frequency (RF) module in the Base Station. The remote end 1 includes an RF module, and the remote end 2 includes an RF module. Therefore, three RF modules are required for one cell to cover multiple areas in FIG. 1.

In FIG. 2, floors 1-10 and floors 11-20 belong to the same cell. A local end 1 and a remote end 1 constitute a repeater, and the repeater covers higher floors 11-20. A local end 2 and a remote end 2 constitute another repeater, and this repeater covers lower floors 1-10. Therefore, one Base Station and two repeaters accomplish coverage for two areas (higher-floor area, and lower-floor area) in a cell. The higher-floor area and the lower-floor area belong to one cell, and the cell corresponds to one RF module in the Base Station. The remote end 1 includes an RF module, and the remote end 2 includes an RF module. Therefore, three RF modules are required for one cell to cover multiple areas in FIG. 2.

Solution 2: A Baseband Unit (BBU) and a Remote Radio Unit (RRU) enable one cell to cover multiple areas, as shown in FIG. 3.

In FIG. 3, lower floors 1-10 and higher floors 11-20 belong to the same cell. RRU 1 covers higher floors 11-20, RRU 2 covers lower floors 1-10, and RRU 1 and RRU 2 are connected with the BBU in the Base Station through a Digital Combiner and Divider unit. Therefore, two remote RF modules and a digital combiner and divider unit accomplish coverage for both the higher-floor area and the lower-floor area in a cell.

In the process of implementing the present invention, the inventor finds at least the following two problems in solution 1 in the conventional art.

Problem 1: The system capacity is decreased. The repeater raises the noise floor of the Base Station. The rise of the noise floor interferes with all users in the same cell, and increases interference to neighboring cells. Moreover, in the uplink direction, the RF module in the Base Station receives signals of User Equipment (UE) in multiple coverage areas simultaneously, and the uplink signals lead to interference between different areas; in the downlink direction, the UE in a coverage area receives the downlink signals sent to the UE in other coverage areas while receiving the downlink signals sent to this UE, and the downlink signals lead to interference between different areas. Such factors affect the system capacity.

Problem 2: If multiple areas in a cell need to be split into cells, additional RF modules need to be set in the Base Station, and re-cabling is required for the RF modules and the local end in the Base Station. Therefore, the cell splitting is costly and difficult.

In the process of implementing the present invention, the inventor finds at least the following two problems in solution 2 in the conventional art.

Problem 1: Interference exists between users in a cell. For example, in the uplink direction, the signals of UE 1 in the higher-floor area are gathered by the digital combiner to the BBU, and lead to interference to UE 2 in the lower-floor area.

Problem 2: The downlink capacity is decreased. For example, in the downlink direction, if only UE 2 in the lower-floor area is in a conversation, the transmitting power of RRU 2 is 1 w. However, due to principles of the digital combiner and divider unit, the transmitting power of RRU 1 is 1 w too. For RRU 1, such power is wasted, and is equivalent to decrease of the downlink capacity. Besides, if UE 1 and UE 2 in different areas talk with each other, according to the digital combiner and divider unit, RRU 1 sends downlink signals to both UE 1 and UE 2 simultaneously. UE 1 receives not only the required signals, but also the downlink signals sent by RRU 1 to UE 2, which are interference to UE 1 and further decrease the downlink capacity.

SUMMARY

The embodiments of the present invention provide a system and a method for one cell to cover multiple areas, and a network device to increase the uplink capacity and the downlink capacity, reduce the networking cost, and facilitate the implementation of cell splitting.

The system for one cell to cover multiple areas includes: (1) a Base Station which comprises a Baseband Unit (BBU), wherein the BBU of the Base Station is connected with multiple Radio Frequency (RF) groups through multiple data channels, and each RF group corresponds to an area in a cell and corresponds to a data channel; and (2) the multiple RF groups, configured to: receive uplink signals sending from a UE in the corresponding area, send the uplink signals to the BBU through the data channel corresponding to the RF group, receive downlink signals through the corresponding data channel, and send the downlink signals to the UE in the corresponding area.

In the method for one cell to cover multiple areas in an embodiment of the present invention, each RF group corresponds to an area in a cell, and each data channel corresponds to an RF group. The method includes: (1) receiving, by an RF group, uplink signals in the corresponding area, and sending the uplink signals to a BBU through the data channel corresponding to the RF group; (2) receiving, by the BBU, the uplink signals through the data channel, and sending downlink signals to the corresponding RF group through the data channel corresponding to the downlink signals; and (3) receiving, by the RF group, the downlink signals through the data channel corresponding to the downlink signals, and sending the downlink signals to the area corresponding to the RF group.

A base Station provided in an embodiment of the present invention includes: a Baseband Unit (BBU), configured to receive uplink signals of a User Equipment (UE) sending from at least one Radio Frequency (RF) group of multiple RF groups through at least one data channel of multiple data channel, and send downlink signals to at least one RF group of the multiple RF groups through the data channel corresponding to the downlink signals; wherein, the BBU is connected with the multiple RF groups through the multiple data channels and each data channel corresponds to an RF group.

An RNC provided in an embodiment of the present invention includes: (1) a storing module, configured to record identifier information of a data channel that bears uplink signals according to the uplink signals found by a BBU in a Base Station; and (2) a downlink control module, configured to determine the data channel corresponding to downlink signals according to information in the downlink signals to be sent and according to the recorded identifier information of the data channel that bears the uplink signals, and output control information on the data channel corresponding to the downlink signals to the BBU of the Base Station.

The foregoing technical solution reveals that: In the embodiments of the present invention, multiple data channels of the BBU are applied; each data channel is connected with an RF group so that the RF group can exchange signals with the BBU through the corresponding data channel. Therefore, in the uplink direction, the BBU can receive the uplink signals in the areas corresponding to different RF groups through multiple data channels; when the uplink signals in different areas are sent to the BBU through different data channels, the interference caused by the uplink signals between different areas is avoided, and the uplink capacity is improved; in the downlink direction, the BBU sends downlink signals to the UEs in different areas through different data channels; when the downlink signals in different areas are sent through different data channels, the interference caused by the downlink signals between different areas is avoided, and the downlink capacity is improved. Moreover, in the case that downlink signals do not need to be sent in the area corresponding to one RF group but need to be sent in the areas corresponding to other RF groups, power transmitting is not required in all RF groups, and the downlink capacity is further improved. When multiple areas in a cell are split into multiple cells, no re-cabling is required, thus reducing the cost of cell splitting and facilitating the implementation of cell splitting.

DETAILED DESCRIPTION

A system for one cell to cover multiple areas in an embodiment of the present invention includes multiple RF groups and at least one BBU. The BBU is connected with multiple RF groups through multiple data channels. That is, one BBU corresponds to multiple data channels, and is connected with an RF group through a data channel. The data channel is configured to exchange information between the RF group and the BBU. The data channel may include an antenna interface of the BBU, or include a digital-analog conversion module between the RF group and the BBU. This embodiment of the present invention does not restrict the style of the data channel.

Figure 1:
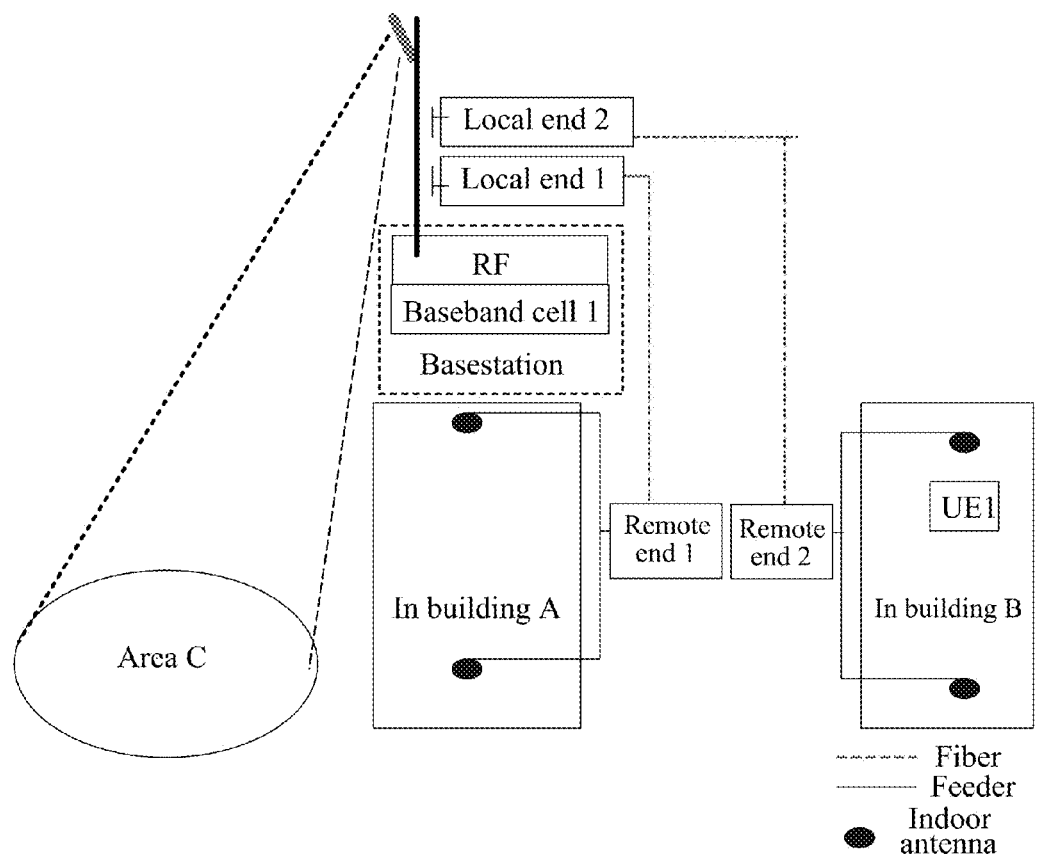
FIG. 1 is the first schematic diagram of one cell covering multiple areas through "Base Station+repeater" in the conventional art.

In the embodiments of the present invention, one RF group corresponds to an area in a cell. That is, one RF group covers an area in a cell. The area in the embodiments of the present invention is specific to an RF group, namely, the scope covered by an RF group is regarded as an area. For example, area C in FIG. 1 serves as an area, and corresponds to an RF group, and building A and building B serve as another area and correspond to an RF group. That is, one RF group covers area C, and the other RF group covers building A and building B.

In the embodiments of the present invention, the quantity of the RF groups depends on the quantity of data channels. That is, the quantity of the RF groups may keep consistent with the quantity of the data channels. For example, if a BBU corresponds to n data channels, the quantity of the RF groups may be n. In this case, an RF group may correspond to a data channel. In the embodiments of the present invention, the quantity of the RF groups may also be less than the quantity of data channels. For example, if a BBU corresponds to 5 data channels, the quantity of the RF groups may be an integer between 1 and 5. In this case, some data channels may correspond to no RF group.

The RF group is configured to send uplink signals to the BBU through a data channel, and send downlink signals from the data channel. The uplink signals received by the RF group are sent by the UE in coverage area of the RF group. After receiving the uplink signals from the UE, the RF group sends the uplink signals to the BBU through the corresponding data channel. After receiving the downlink signals on the data channel, the RF group sends the downlink signals to the UE in coverage area of the RF group.

The BBU is configured to receive uplink signals and send downlink signals through multiple data channels. The BBU may receive uplink signals of the UEs in different areas in a cell from multiple data channels. The BBU may send downlink signals through the corresponding data channel. For example, when the downlink signal is sent to a UE in an area, the BBU may send the downlink signal through a data channel corresponding to an RF group that covers the UE. In this way, other RF groups do not perform transmitting operations for this downlink signal, thus avoiding decrease of the downlink capacity mentioned in the second solution in the conventional art.

When the BBU receives the uplink signal, the BBU may search each data channel respectively. After an uplink signal is found on the data channel, the BBU performs subsequent processing for the uplink signal found on the data channel. The signal processing may be finger demodulation, channel estimation, maximum ratio combination, or decoding, or any combination thereof. This embodiment of the present invention does not restrict the process of processing the uplink signals. If the BBU finds no uplink signal on a data channel, the signals such as noise on the data channel are not involved in the subsequent signal processing, thus avoiding interference caused by noise to the uplink signals.

When sending the downlink signals, the BBU may send the downlink signals through the corresponding data channel according to the control of the RNC, or send the downlink signals through the corresponding data channel according to its own control. The process of control on sending the downlink signals through the corresponding data channel may be implemented by selecting the data channel corresponding to the downlink signals intelligently according to the information about the received uplink signals. For example, in the process of receiving the uplink signals through the data channel, the BBU may determine the data channel that bears the received uplink signals. The BBU may send the identifier information of the data channel that bears the uplink signals to the RNC, and the RNC may determine the data channel corresponding to downlink signals according to the identifier information of the data channel that bears the received uplink signals and according to the information in the downlink signals. Therefore, the BBU may send the downlink signals according to the data channel determined by the RNC. The BBU may record the identifier information of the data channel that bears the uplink signals. In this way, the BBU may determine the data channel corresponding to the downlink signals according to the recorded identifier information of the data channel that bears the uplink signals and according to the information in the downlink signals, and send the downlink signals through the determined data channel. The identifier information of the data channel that bears the uplink signals may include the identifier information of the uplink signals and the identifier information of the data channel.

In this embodiment, the BBU includes: multiple Searchers, a signal processing unit, and a downlink sending module.

Each Searcher corresponds to a data channel, namely, a Searcher corresponds to an RF group. The Searcher searches the corresponding data channel to check whether any uplink signals exist on the data channel. When finding any uplink signal on the data channel, the Searcher sends the uplink signal to the signal processing unit. If the Searcher finds no uplink signal on the corresponding data channel, the signals such as noise on the data channel are not sent to the signal processing unit, thus avoiding interference caused by noise to the uplink signals. After searching out any uplink signal on the data channel, the Searcher may output the identifier information of the data channel that bears the uplink signals.

The signal processing unit is configured to process the uplink signals transmitted by the Searcher. The processing may be finger demodulation, signal estimation, maximum ratio combination, or decoding, or any combination thereof. Accordingly, the signal processing unit includes but is not limited to: a finger demodulator, a channel estimating module, a Maximum Ratio Combination (MRC) module, or a decoder, or any combination thereof. The processing performed by the signal processing unit for the uplink signals may be set according to the requirements in the actual network. The process of the Base Station processing uplink signals in the conventional art is applicable. This embodiment of the present invention does not restrict how the signal processing unit processes the uplink signals.

The downlink sending module is configured to send the downlink signals through the corresponding data channel according to the received control information. The control information received by the downlink sending module may be transmitted from other modules in the BBU, or from the RNC.

If the control information received by the downlink sending module is transmitted from other modules in the BBU, the BBU further includes a storing module and a downlink control module.

The storing module is configured to record identifier information of the data channel that bears the uplink signals according to the uplink signals found by the Searcher. For example, the storing module receives and stores the identifier information of the data channel that bears the uplink signals output by the Searcher. The identifier information of the data channel that bears the uplink signals may include the mapping relation between the uplink signal and the data channel.

The downlink control module is configured to determine the data channel corresponding to downlink signals to be sent according to the information in the downlink signals and identifier information of the data channel that bears the uplink signals stored in the storing module, and output control information to the downlink sending module.

The storing module and the downlink control module may also be set in the RNC.

The RF group in this embodiment is appropriate only if it can receive downlink signals and send the downlink signals to the UE, and can receive uplink signals of the UE and send the uplink signals to the BBU. The RF group may be any type of receiving and sending apparatuses in the conventional art. For example, the RF group may be a combination of a remote RF module, an RF module, and a combiner, or a combination of multiple remote RF modules and a remote RF module hub (RHUB), or a combination of a repeater, a coupler and an RF module, or a combination of a trunk amplifier, a coupler, and an RF module. This embodiment of the present invention does not restrict the style of the RF group.

A system for one cell to cover multiple areas in an embodiment of the present invention is described below with reference to the accompanying drawings.

Figure 4:
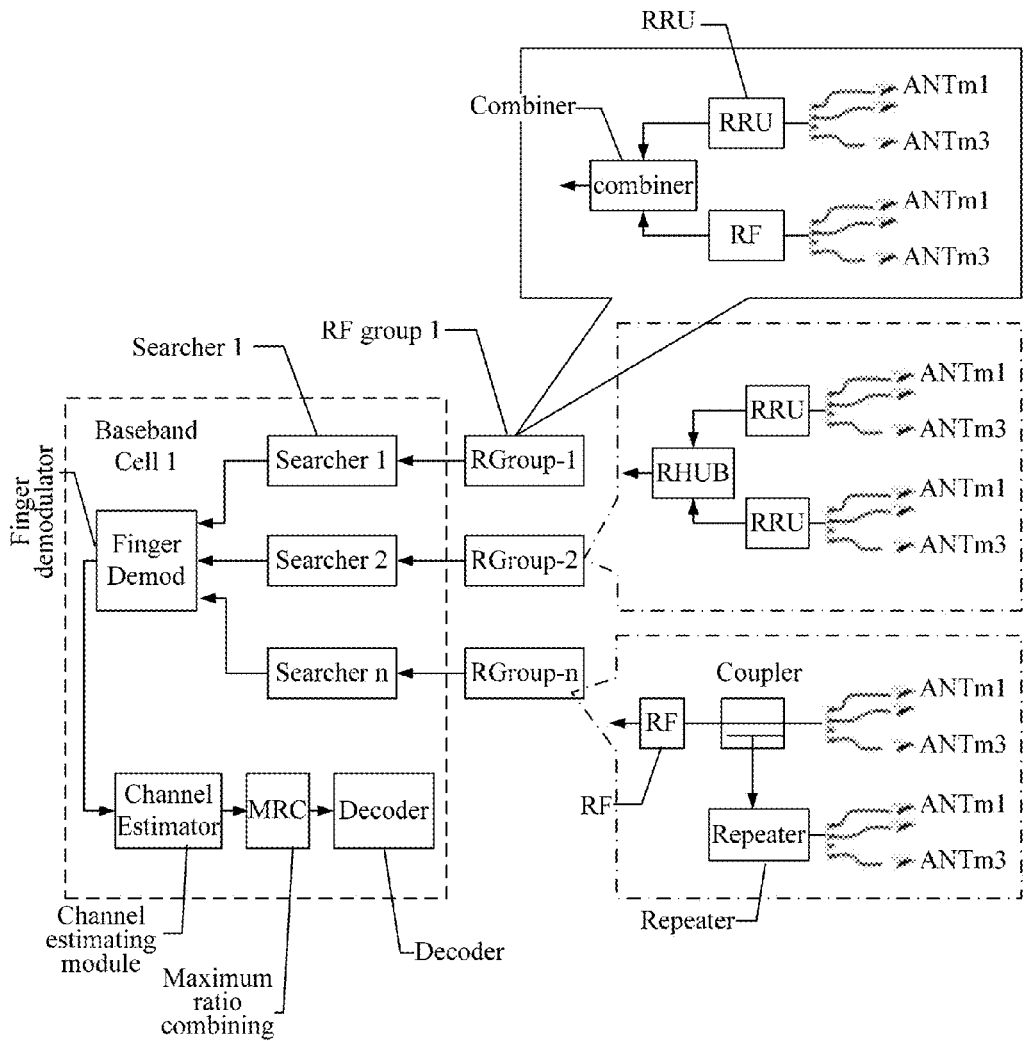
FIG. 4 shows a system for one cell to cover multiple areas in an embodiment of the present invention.

FIG. 4 shows a system for one cell to cover multiple areas in an embodiment of the present invention. In FIG. 4, the system for one cell to cover multiple areas includes n (n≥1) RF groups and a BBU.

FIG. 4 illustrates only three types of RF groups. In RF group 1 (RGroup-1), an RRU and an RF module are connected with the combiner. The uplink signals are sent to the BBU over the corresponding data channel through an RRU/RF and a combiner; and the downlink signals are sent to the UE in the area covered by RGroup-1 over the corresponding data channel through a combiner, an RRU, and an RF module. Two RRUs in RF group 2 (RGroup-2) are connected with one RHUB. Nevertheless, RGroup-2 may include more RRUs. The uplink signals are sent to the BBU over the corresponding data channel through an RRU and an RHUB, and the downlink signals are sent to the UE in the area covered by RGroup-2 over the corresponding data channel through an RHUB and an RRU. A repeater in RF group n (RGroup-n) is connected with the RF module through a coupler. The repeater in RGroup-n may also be a trunk amplifier, the uplink signals are sent to the BBU over the corresponding data channel through a repeater, a coupler, and an RF, or sent to the BBU over the corresponding data channel through an RF directly, and the downlink signals are sent to the UE in the area covered by RGroup-n over the corresponding data channel through an RF, or sent to the UE in the area covered by RGroup-n over the corresponding data channel through an RF, a coupler, and a repeater. Other implementation modes of the RF group are not enumerated here any further.

The BBU in FIG. 4 includes n (n≥1) Searchers, a Finger Demodulator, a Channel Estimator module, an MRC module, and a Decoder. The Finger Demodulator, the Channel Estimator module, the MRC module, and Decoder make up a signal processing unit. The signal processing unit may also be set according to the network conditions. Other modes of the signal processing unit are not elaborated here any further. FIG. 4 does not show the Downlink Sending module in the BBU, the Storing module or the Downlink Control module in the system.

Each Searcher searches for the corresponding RF group (RGroup) as an antenna of Cell 1 (BBU1).

In the uplink direction, each Searcher searches for the finger of the corresponding RGroup. Searching for a finger is equivalent to searching for an uplink signal. If no finger of the RGroup is found, the data such as noise in the corresponding data channel is not involved in the finger demodulation and the subsequent signal processing. That is, such data (noise) does not cause any interference to the uplink signals of the current UE, starting from the Searcher. That improves the uplink capacity of the cell. According to the search result of the Searcher, the Searcher may output the information about the RGroup that send the uplink signals of the UE. That is, the Searcher may output the identifier information of the data channel that bears the uplink signals.

In the downlink direction, the BBU or RNC may determine the data channel corresponding to the downlink signals according to the search results of the uplink signals. For example, the BBU or RNC may determine the data channel corresponding to the downlink signals according to the Searcher output which reveals the RGroup that sends the uplink signals. Therefore, the BBU may transmit the downlink signals to the RGroup in the area that covers the UE through the corresponding data channel, without the need of transmitting downlink signals to all RGroups in the cell.

In the conventional art, any UE in the same cell may receive the downlink signals of all UEs in the cell. In this embodiment, although multiple RGroups belong to the same cell, the BBU may make downlink signals be transmitted in only the area that covers the UE according to the RF group selected intelligently. In this way, the UE receives only the downlink signals of all UEs in the area covered by the RGroup of this UE rather than receives the downlink signals of all UEs in the area covered by other RGroup in this cell, thus reducing interference between downlink signals, saving the downlink transmitting power, increasing the downlink capacity, and decreasing the operation cost.

The system in this embodiment can select an area intelligently for transmitting downlink signals. Therefore, the system in this embodiment is known as a Smart Multi-RRU/RF One Cell (SMROC) system.

Figure 2:
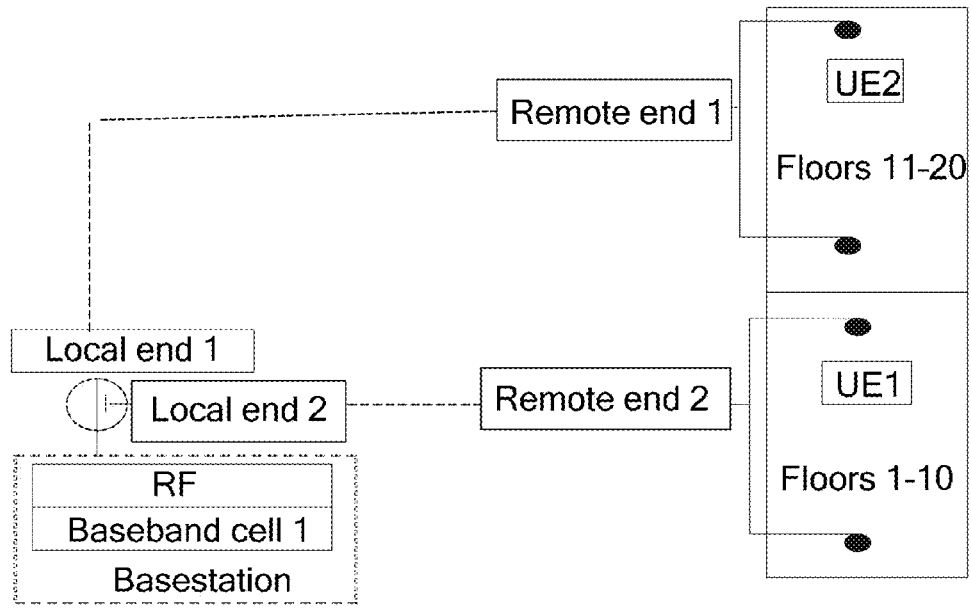
FIG. 2 is the second schematic diagram of one cell covering multiple areas through "Base Station+repeater" in the conventional art.
Figure 3:
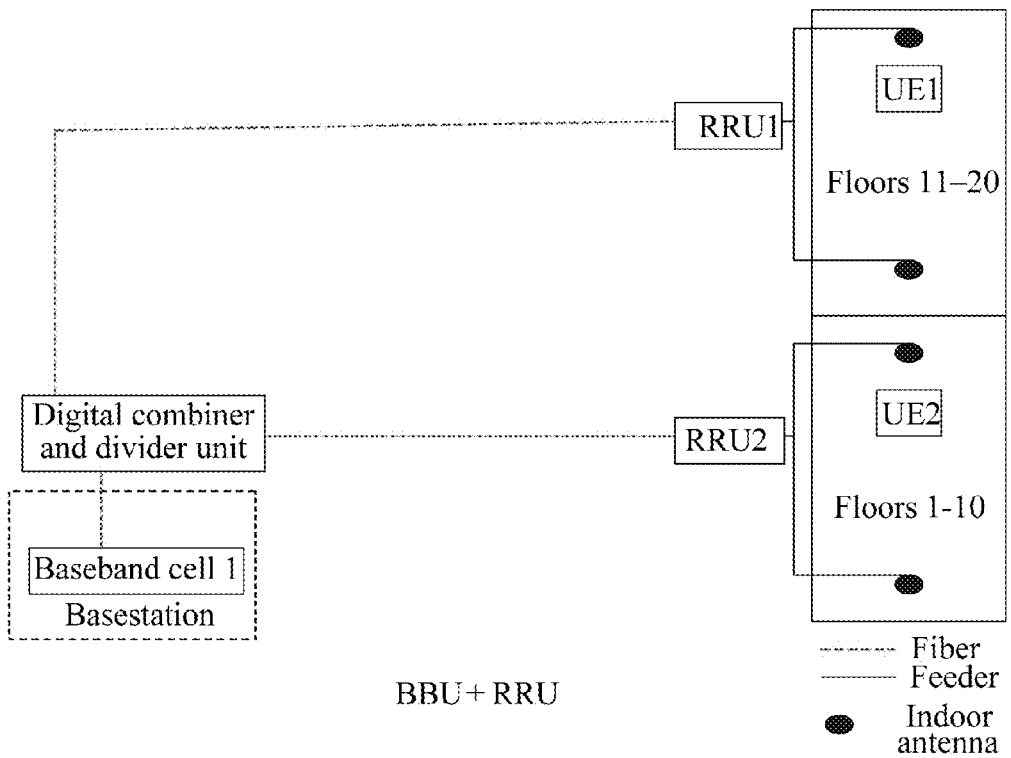
FIG. 3 is a schematic diagram of one cell covering multiple areas through "BBU+RRU" in the conventional art.
Figure 5:
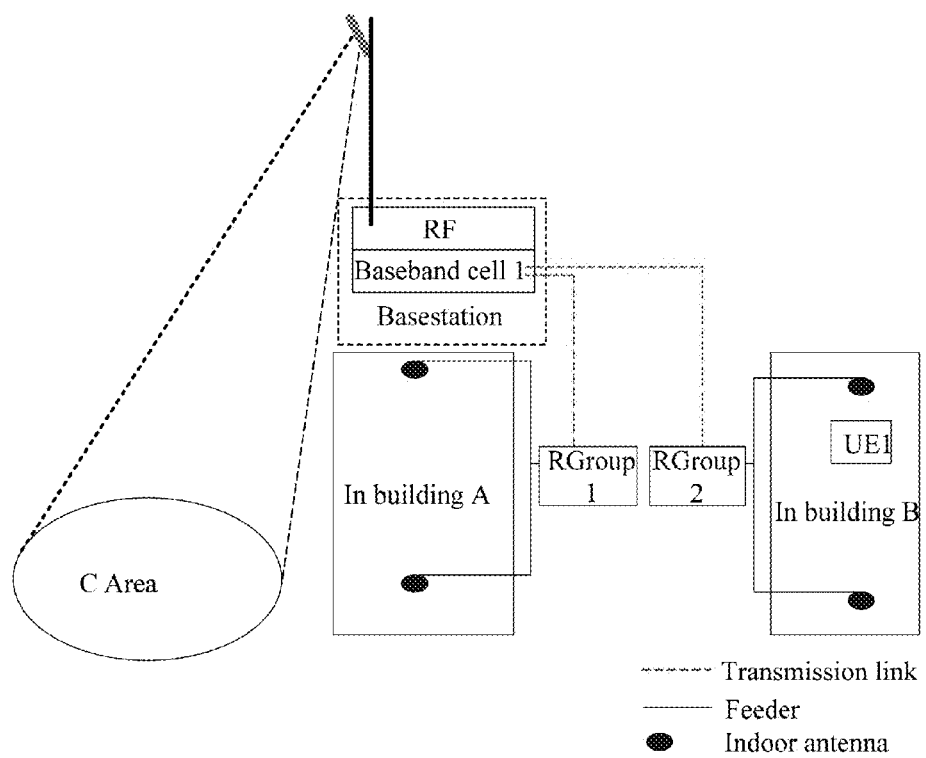
FIG. 5 is the first schematic diagram of an application scenario of a system for one cell to cover multiple areas in an embodiment of the present invention.
Figure 6:
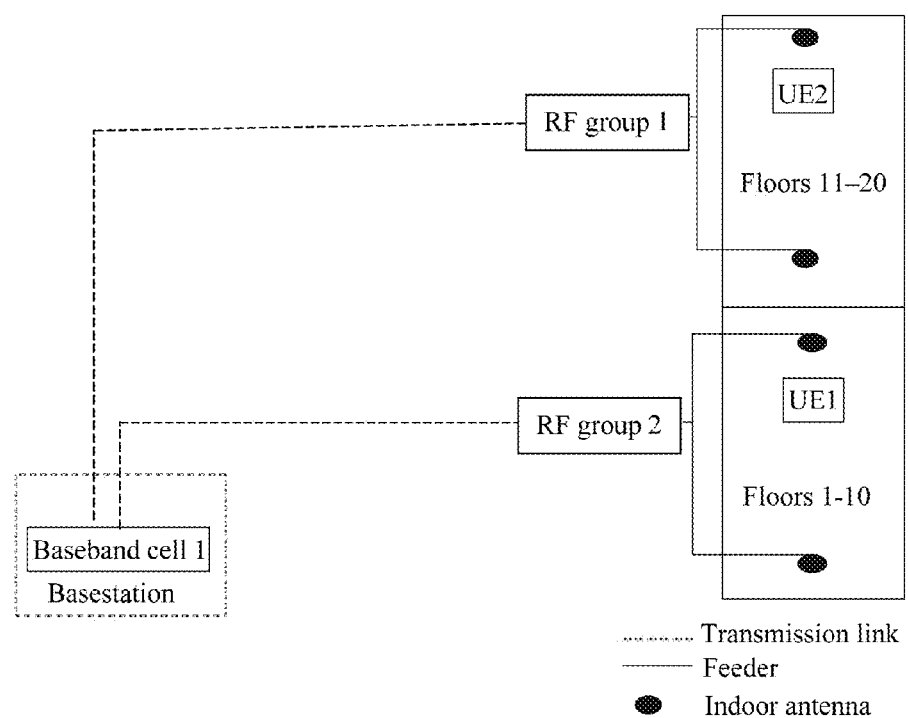
FIG. 6 is the second schematic diagram of an application scenario of a system for one cell to cover multiple areas in an embodiment of the present invention.
Figure 7:
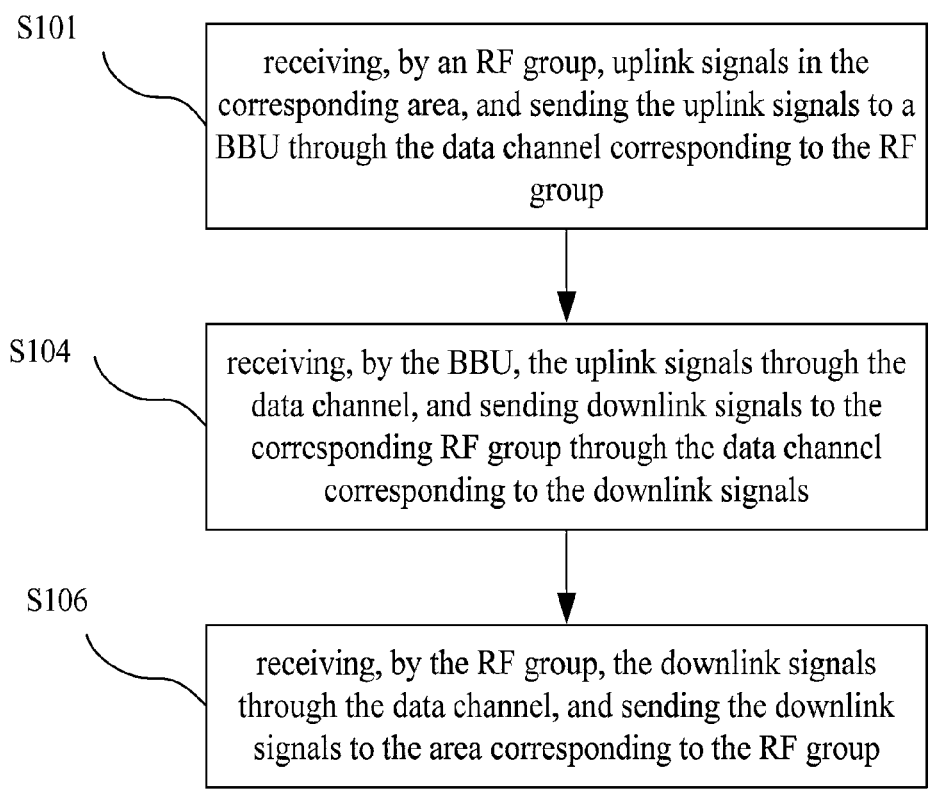
FIG. 7 is a schematic flow chart describing an embodiment of a method for one cell to cover multiple areas.

As shown in FIG. 5 and FIG. 6, the system provided in an embodiment of the present invention is elaborated below with reference to specific application scenarios. The application scenario of FIG. 5 and FIG. 6 is the same as the application scenario of FIG. 1 and FIG. 2.

In FIG. 5, three areas, namely, area C, building A, and building B belong to the same cell. RGroup-1 covers the area of building A, RGroup-2 covers the area of building B, and the RF module in the Base Station covers area C. The RF module in the Base Station, RGroup-1, and RGroup-2 are connected with the BBU in the Base Station. At the beginning of network construction, area A, area B, and area C may be one cell, and the three areas in the cell may share the baseband resources in the Base Station. Three areas A, B, and C may exchange signals with the BBU through three data channels. In this way, the UE in any of areas A, B, and C never receives the downlink signals of the UE in other areas, thus avoiding the downlink signal interference between area A, area B and area C, and increasing the downlink capacity. In the uplink direction, area A, area B, and area C send uplink signals to the BBU through different data channels, thus avoiding the uplink signal interference between area A, area B, and area C, and increasing the uplink capacity. Moreover, in the subsequent network evolution, upgrade, and expansion, if three areas in a cell need to be split into three cells, that purpose may be accomplished without cable adjustment, thus avoiding high costs and difficulty of cell splitting caused by re-cabling. If three areas in a cell need to be split into three cells, and the RGroup-1 and RGroup-2 include an RRU, no RF module needs to be added for RGroup-1 and RGroup-2 in the Base Station.

In FIG. 6, floors 1-10 and floors 11-20 belong to the same cell. RGroup-1 covers the higher-floor area, and RGroup-2 covers the lower-floor area. Therefore, two areas (higher-floor area and lower-floor area) in a cell are covered through two RF groups. At the beginning of network construction, the higher-floor area and the lower-floor area may be one cell, and two areas in the cell may share the baseband resources in the Base Station. The higher-floor area and the lower-floor area may exchange signals with the BBU through two data channels. In this way, the UE in neither the higher-floor area nor the lower-floor area receives the downlink signals of the UE in other areas, thus avoiding the downlink signal interference between the higher-floor area and the lower-floor area and increasing the downlink capacity. In the uplink direction, the higher-floor area and the lower-floor area send uplink signals to the BBU through different data channels, thus avoiding the uplink signal interference between the higher-floor area and the lower-floor area, and increasing the uplink capacity. Moreover, in the application scenario in FIG. 6, only two RF modules need to be set for the RF group in this embodiment. As shown in FIG. 6 in comparison with FIG. 2, an RF module is saved in the system in this embodiment, and the networking cost is reduced. Moreover, in the subsequent network evolution, upgrade, and expansion, if two areas in a cell need to be split into two cells, that purpose may be accomplished without cable adjustment, thus avoiding high costs and difficulty of cell splitting caused by re-cabling. If two areas in a cell need to be split into two cells, and the RGroup-1 and RGroup-2 include an RRU, no RF module needs to be added for RGroup-1 and RGroup-2 in the Base Station.

The Base Station and the RNC in this embodiment are the same as those described in the foregoing system embodiment, and are not repeated here any further.

A method for one cell to cover multiple areas in an embodiment of the present invention is described below.

The method involves multiple RF groups and at least one BBU. One BBU corresponds to multiple data channels, a BBU is connected with an RF group through a data channel, and an RF group covers an area in a cell. The area, the quantity of RF groups, and the RF group implementation mode are the same as those described in the foregoing system embodiment.

The method in this embodiment involves a process of transmitting uplink signals and downlink signals.

In the uplink direction, the RF group receives the uplink signals from the UE, and sends the uplink signals to the BBU through the corresponding data channel. When the BBU searches multiple data channels for uplink signals, the BBU processes the found uplink signals. If the BBU finds no uplink signal on a data channel, the BBU does not need to process the signals such as noise on the data channel, thus avoiding interference caused by noise to the uplink signals. After finding an uplink signal, the BBU may record the identifier information of the data channel that bears the uplink signal, and may send the identifier information of the data channel to the RNC. The signal processing and the recording of the identifier information of the data channel that bears the uplink signal are the same as the counterpart processing in the system embodiment described above.

In the downlink direction, the BBU uses the data channel corresponding to the downlink signals to send downlink signals to the corresponding RF group, and the RF group sends the downlink signals to the UE in its coverage area after receiving the downlink signals on the data channel. The BBU may send downlink signals of a UE through a data channel. In some application scenarios, however, the BBU may send the downlink signals of a UE through multiple data channels. When sending the downlink signals, the BBU may send the downlink signals through the corresponding data channel according to the control of the RNC, or send the downlink signals through the corresponding data channel according to its own control. The process of control on sending the downlink signals through the corresponding data channel may be implemented by selecting the data channel corresponding to the downlink signals intelligently according to the information about the received uplink signals. The process of determining the data channel corresponding to the downlink signals according to the uplink signals is the same as the counterpart process in the system embodiment described above.

In the embodiments of the present invention, in the uplink direction, the BBU may receive uplink signals in the areas corresponding to different RF groups through multiple data channels. Therefore, when the uplink signals in different areas are sent to the BBU through different data channels, the uplink signal interference between different areas is avoided, and the uplink capacity is increased. Moreover, if the BBU finds no uplink signal from a data channel, the BBU does not perform subsequent processing for the signals such as noise on the data channel, and the interference caused by the signals such as noise to the uplink signals is avoided. In the downlink direction, the BBU or RNC may select the data channel corresponding to the downlink signals intelligently according to the uplink signals. In this way, the BBU may send the downlink signals to the UEs in different areas through different data channels. When the downlink signals in different areas are sent through different data channels, the downlink signal interference between different areas is avoided, and the downlink capacity is increased. Moreover, in the case that the area corresponding to an RF group has no downlink signal ready for sending but the area corresponding to other RF groups has downlink signals ready for sending, the situation that all RF groups need power transmitting is avoided, and the downlink capacity is further increased. When multiple areas in the cell are split into multiple cells, no re-cabling is required, thus reducing the cost of cell splitting and facilitating the implementation of cell splitting. Moreover, when multiple areas in a cell are split into multiple cells, if the RF group includes an RRU, the system in this embodiment does need to add an RF module at the Base Station, thus reducing the networking cost and facilitating the cell splitting, namely, facilitating the upgrade and expansion in network evolution.

Although the invention has been described through several preferred embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claim is:

1. A base station, comprising:
a baseband unit (BBU), configured to receive uplink signals of a user equipment (UE) from at least one radio frequency (RF) group of multiple RF groups through at least one data channel of multiple data channels, to determine information about the at least one RF group which the uplink signals of the UE are received from and to allocate power of downlink signals of the UE in the multiple RF groups according to the information about the at least one RF group which the uplink signals of the UE are received from to avoid that each of the multiple RF groups needs transmission consumption;
wherein, the BBU is configured to connect with the multiple RF groups through the multiple data channels, the multiple RF groups belong to a same cell, an area which each of the multiple RF groups corresponds to in the cell is different from each other and one of the multiple RF groups which each of the multiple data channels corresponds to is different from each other.

2. The base station of claim 1, wherein the BBU is configured to allocate power of downlink signals of the UE in the multiple RF groups comprises: the BBU is configured to send the downlink signals of the UE to the at least one RF group which the uplink signals of the UE are received from.

3. The base station of claim 2, wherein the BBU is configured to send the downlink signals of the UE to the at least one RF group which the uplink signals of the UE are received from comprises: the BBU is configured to send the downlink signals of the UE to the at least one data channel corresponding to the at least one RF group which the uplink signals of the UE are received from.

4. The base station of claim 1, wherein the BBU is configured to determine information about the at least one RF group which the uplink signals of the UE are received from comprises: the BBU is configured to determine the at least one data channel which bears the uplink signals of the UE.

5. The base station of claim 2, wherein the BBU comprises:
multiple searchers, each searcher corresponds to a data channel of the multiple data channels, configured to search for the uplink signals of the UE on the multiple data channels, to send the uplink signals of the UE to a signal processing unit when finding the uplink signals on a data channel of the multiple data channels and to output the information about the at least one RF group which the uplink signals of the UE are received from;
the signal processing unit, configured to process the uplink signals received from the searchers;
a downlink sending module, configured to send the downlink signals of the UE through the at least one data channel corresponding to the at least one RF group which the uplink signals of the UE are received from.

6. The Base Station of claim 5, wherein the BBU further comprises:
a storing module, configured to record identifier information of the at least one data channel that bears uplink signals according to the uplink signals found by the searchers, wherein the identifier information of the at least one data channel that bears uplink signals is the information about the at least one RF group which the uplink signals of the UE are received from; and
a downlink control module, configured to determine the at least one data channel corresponding to downlink signals to be sent according to information in the downlink signals and according to the recorded identifier information of the data channel that bears the uplink signals, and to send a control information on the data channel corresponding to the downlink signals to a downlink sending module; and wherein the downlink sending module is configured to send the downlink signals through the at least one corresponding data channel according to received control information.

7. The base station of claim 5, wherein the BBU is further configured to output the information about the at least one RF group which the uplink signals of the UE are received from to a radio network controller (RNC) and to receive control information on the at least one data channel corresponding to the downlink signals from the RNC and wherein the downlink sending module is configured to send the downlink signals through the at least one corresponding data channel according to the received control information.

8. The base station of claim 1, wherein the base station comprises the multiple RF groups and the multiple data channels, and wherein one of the multiple RF groups comprises a remote radio unit (RRU).

9. A method for one cell to cover multiple areas, characterized in that a baseband unit (BBU) is configured to connect with multiple radio frequency (RF) groups through multiple data channels, and the multiple RF groups belong to the cell, an area which each of the multiple radio frequency (RF) groups corresponds to in the cell is different from each other, one of the multiple RF groups which each of the multiple data channels corresponds to is different from each other, and the method comprises:

receiving, by the BBU, uplink signals of a user equipment (UE) from at least one RF group of the multiple RF groups through at least one data channel of the multiple data channels;

determining, by the BBU, information about the at least one RF group which the uplink signals of the UE are received from; and allocating, by the BBU, power of downlink signals of the UE in the multiple RF groups, according to the information about the at least one RF group which the uplink signals of the UE are received from to avoid that each of the multiple RF groups needs transmission power consumption.

10. The method of claim 9, wherein the step of allocating, by the BBU, power of downlink signals of the UE in the multiple RF groups wherein the power of downlink signals of the UE is determined according to the information about the at least one RF group which the uplink signals of the UE are received from comprises:

sending, by the BBU, the downlink signals of the UE to the at least one RF group which the uplink signals of the UE are received from.

11. The method of claim 10, wherein the step of sending, by the BBU, the downlink signals of the UE to the at least one RF group which the uplink signals of the UE are received from comprises:

sending, by the BBU, the downlink signals of the UE to the at least one data channel corresponding to the at least one RF group which the uplink signals of the UE are received from.

12. The method of claim 9, wherein the step of determining, by the BBU, information about the at least one RF group which the uplink signals of the UE are received from comprises:

determining, by the BBU, the at least one data channel which bears the uplink signals of the UE; and determining, by the BBU, the information about the at least one RF group which the uplink signals of the UE are received from according to a relationship between the data channel and the RF group.

13. The method of claim 10, wherein the method further comprises:

searching, by the BBU, for the uplink signals of the UE on the multiple data channels;

processing, by the BBU, the uplink signals of the UE which bears on the at least one data channel of the multiple data channels when finding the uplink signals on the at least one data channel; and wherein the determining information about the at least one RF group which the uplink signals of the UE are received from comprises:

obtaining, by the BBU, the information about the at least one RF group which the uplink signals of the UE are received from through the searching.

14. The method of claim 13, wherein the method further comprises:

recording, by the BBU, identifier information of the at least one data channel that bears the uplink signals when finding the uplink signals on the at least one data channel, wherein the identifier information of the at least one data channel that bears uplink signals is the information about the at least one RF group which the uplink signals of the UE are received from; and wherein the step of determining, by the BBU, information about the at least one RF group which the uplink signals of the UE are received from and allocating, by the BBU, power of downlink signals of the UE in the multiple RF groups, wherein the power of downlink signals of the UE is determined according to the information about the at least one RF group which the uplink signals of the UE are received from comprises:

determining, by the BBU, the at least one data channel corresponding to downlink signals to be sent according to information in the downlink signals and according to the recorded identifier information of the at least one data channel that bears the uplink signals; and sending, by the BBU, the downlink signals through the at least one corresponding data channel according to control information on the at least one data channel corresponding to the downlink signals.

15. The method of claim 13, wherein the method further comprises:

outputting, by the BBU, the information about the at least one RF group which the uplink signals of the UE are received from to a Radio Network Controller, RNC, and receiving, by the BBU, control information about the at least one data channel corresponding to the downlink signals from the RNC;

and wherein the step of allocating, by the BBU, power of downlink signals of the UE in the multiple RF groups, wherein the power of downlink signals of the UE is determined according to the information about the at least one RF group which the uplink signals of the UE are received from comprises:

sending, by the BBU, the downlink signals through the at least one corresponding data channel according to the received control information.

16. A communication system, comprising a base station, wherein the base station comprises:

a baseband unit (BBU), configured to receive uplink signals of a user equipment (UE) from at least one radio frequency (RF) group of multiple RF groups through at least one data channel of multiple data channels, to determine information about the at least one RF group which the uplink signals of the UE are received from and to allocate power of downlink signals of the UE in the multiple RF groups according to the information about the at least one RF group which the uplink signals of the UE are received from to avoid that each of the multiple RF groups needs transmission power consumption;

wherein, the BBU is configured to connect with the multiple RF groups through the multiple data channels, the multiple RF groups belong to a same cell, an area which each of the multiple RF groups corresponds to in the cell is different from each other and one of the multiple RF groups which each of the multiple data channels corresponds to is different from each other.

17. The communication system of claim 16, wherein the BBU comprises:

multiple searchers, each searcher corresponds to a data channel of the multiple data channels, configured to search for the uplink signals of the UE on the multiple data channels, to send the uplink signals of the UE to a signal processing unit when finding the uplink signals on a data channel of the multiple data channels and to output the information about the at least one RF group which the uplink signals of the UE are received from;

the signal processing unit, configured to process the uplink signals received from the searchers;

a downlink sending module, configured to send the downlink signals of the UE through the at least one data channel corresponding to the at least one RF group which the uplink signals of the UE are received from.

18. The communication system of claim 17, wherein the BBU further comprises:

a storing module, configured to record identifier information of the at least one data channel that bears uplink signals according to the uplink signals found by the searchers, wherein the identifier information of the at least one data channel that bears uplink signals is the information about the at least one RF group which the uplink signals of the UE are received from; and a downlink control module, configured to determine the at least one data channel corresponding to downlink signals to be sent according to information in the downlink signals and according to the recorded identifier information of the data channel that bears the uplink signals, and to send a control information on the data channel corresponding to the downlink signals to a downlink sending module; and wherein the downlink sending module is configured to send the downlink signals through the at least one corresponding data channel according to received control information.

19. The communication system of claim 16, further comprising a radio network controller (RNC), and wherein the BBU is further configured to output the information about the at least one RF group which the uplink signals of the UE are received from to the RNC and to receive control information, from the RNC, on the at least one data channel corresponding to the downlink signals and wherein the downlink sending module is configured to send the downlink signals through the at least one corresponding data channel according to the received control information; and the RNC is configured to receive the information about the at least one RF group which the uplink signals of the UE are received from, to determine the data channel corresponding to the downlink signals according to the information about the at least one RF group which the uplink signals of the UE are received from and to send the control information on the determined data channel corresponding to the downlink signals to the BBU.

20. The communication system of claim 16, wherein the RNC comprises:

a storing module, configured to record identifier information of a data channel that bears uplink signals according to the uplink signals found by the BBU; and a downlink control module, configured to determine the data channel corresponding to the downlink signals according to information in the downlink signals to be sent and according to the recorded identifier information of the data channel that bears the uplink signals, and output control information on the data channel corresponding to the downlink signals to the BBU.

* * * * *

UNITED STATES PATENT AND TRADEMARK OFFICE
CERTIFICATE OF CORRECTION

| | | |
|---|---|---|
| PATENT NO. | : 8,855,551 B2 | Page 1 of 1 |
| APPLICATION NO. | : 14/021919 | |
| DATED | : October 7, 2014 | |
| INVENTOR(S) | : Wan | |

It is certified that error appears in the above-identified patent and that said Letters Patent is hereby corrected as shown below:

Title Page, Item (71) Applicant, "Guangdong (CN)" should read --Shenzhen (CN)--.

Signed and Sealed this
Second Day of June, 2015

Michelle K. Lee
*Director of the United States Patent and Trademark Office*